United States Patent Office
2,720,516
Patented Oct. 11, 1955

2,720,516

PROCESS OF MAKING AZO DYESTUFFS OF THE STILBENE SERIES

Gerhard Dittmar, Leverkusen-Schlebusch, and Fritz Suckfüll, Leverkusen-Wiesdorf, Germany, assignors to Farbenfabriken Bayer Aktiengesellschaft, Leverkusen, Germany, a corporation of Germany No Drawing. Application July 2, 1952, Serial No. 296,954

Claims priority, application Germany July 6, 1951

7 Claims. (Cl. 260—143)

The present invention relates to a new process of making azo dyestuffs of the stilbene series.

In German Patent No. 204,212 a process of making azo dyestuffs is described which consists in condensing 1 mol of 4,4'-dinitrostilbene-2,2'-disulfonic acid or 1 mol of 4,4'-dinitrodibenzyl-2,2'-disulfonic acid with 1 mol of an aminoazo compound in sodium hydroxide alkaline medium. The dyestuffs thus obtained are distinguished by a great affinity to vegetable fibres and by a remarkable fastness to light. According to German Patent 463,127 such dyestuffs can be improved in their shade by an after-treatment with oxidizing agents, e. g. with sodium hypochlorite solution. An after-treatment of the dyestuffs obtained by the process of German Patent 204,212 with alkaline reducing agents and oxidizing agents in any order causes besides other advantages in some cases a considerable increase of the fastness to light; this process is described in German Patent 591,628. All the dyestuffs prepared according to the above mentioned processes show a very bad alkaline dischargeability; in spite of their other very good fastness properties the application of these dyestuffs, particularly in the printing process, is therefore strongly limited. The analysis by means of the paper chromatography has now proved that the dyestuffs in question are mixtures consisting in every case of two main constituents of which one is dischargeable and the other not dischargeable.

Our present invention now makes it possible to produce the valuable dischargeable component in pure form by a technically simple method. By changing the hitherto condensation process at first the portion of the dischargeable component is increased at the expense of the non-dischargeable component. Then the mixture of the two components is converted into the corresponding hydrazo-azo compounds by reduction; the hydrazo-azo compounds can be separated on account of their different solubility. The dischargeable component is then recovered in pure form from its hydrazo-azo compound by oxidizing it.

The change of the condensation process consists in using per 1 mol of 4,4'-dinitrostilbene-2,2'-disulfonic acid or 4,4'-dinitrodibenzyl-2,2'-disulfonic acid about 1.6 to 2 mols of aminoazo dyestuff instead of only 1 mol as hitherto has been done. It has proved expedient to add the 4,4'-dinitrostilbene-2,2'-disulfonic acid or the 4,4'-dinitrodibenzyl-2,2'-disulfonic acid in portions to the aminoazo compound and to increase the condensation time to about 20 to 30 hours. By this change the portion of the dischargeable component is being increased as already mentioned above.

The reduction of the mixture of the components can be effected in alkaline solution by means of mild reducing agents such as dextrose. The hydrazo-azo compounds of the dischargeable and the non-dischargeable component show in contrast to the not reduced dyestuffs considerable differences in the solubility, so that an easy separation simply by filtering or pressing is possible. The re-oxidation can be effected by means of air or another oxidizing agent.

The folowing examples illustrate the invention without, however, limiting it thereto, the parts being by weight:

*Example 1*

29.9 parts of the sodium salt of 4-aminoazobenzene-4'-sulfonic acid are dissolved in 600 parts of water and 46 parts of caustic soda solution 40° Bé. and heated to the boil. To the boiling solution 5 portions of 5.7 parts each of the sodium salt of 4,4'-dinitrostilbene-2,2'-disulfonic acid are added at intervals of 2 hours. Thereafter heating is continued for further 20 hours. The solution is diluted with 300 parts of water, and 6 parts of dextrose and 30 parts of caustic soda solution 40° Bé. are added at a temperature of 70° C. After 15 minutes 200 parts of common salt are added and the mixture is filtered. The filtrate is oxidized by blowing in air at 65° C. The dyestuff separates in an easily filterable form and represents, when dried, a light red powder. It easily dissolves in water with an orange-yellow color, and in sulfuric acid 60° Bé. with a light blue color. When dyed on cotton it yields yellowish orange shades; the dyeings have a very good alkaline and neutral dischargeability.

*Example 2*

26.3 parts of 4-aminoazobenzene-4'-carboxylic acid are dissolved in 1000 parts of water and 77 parts of caustic soda solution 40° Bé., and heated to the boil. To the boiling solution 5 portions of 5.7 parts each of the sodium salt of 4,4'-dinitrostilbene-2,2'-disulfonic acid are added at intervals of 3 hours. Thereafter heating is continued for further 20 hours. 250 parts of common salt are added, and the mixture is filtered. The residue of the filtration is mixed with 2000 parts of water, and 7.5 parts of dextrose and 150 parts of caustic soda solution 40° Bé. are added at a temperature of 70° C. After 10 minutes 200 parts of common salt, activated carbon and kieselguhr are added, and the mixture is filtered. The filtrate is oxidized by means of sodium hypochlorite solution at 50° C. The dyestuff obtained represents, when dried, a brown-red powder and dissolves in water with an orange-red color, and in sulfuric acid 60° Bé. with a light blue color. When dyed on cotton it yields reddish orange shades; the dyeings show a very good alkaline and neutral dischargeability.

*Example 3*

31.3 parts of the sodium salt of 2-methyl-4-aminoazobenzene-4'-sulfonic acid are dissolved in 600 parts of water and 50 parts of caustic soda solution 40° Bé. and heated to the boil. To the boiling solution 5 portions of 4.75 parts each of the sodium salt of 4,4'-dinitrostilbene-2,2'-disulfonic acid are added at intervals of 3 hours. Thereafter heating is continued for further 15 hours. 150 parts of common salt are added, and the mixture is filtered. The residue of the filtration is mixed with 1,000 parts of water, and 8 parts of dextrose and 75 parts of caustic soda solution 40° Bé. are added at a temperature of 70° C. After 15 minutes 250 parts of common salt are added, and the solution is filtered. The filtrate is oxidized by means of hydrogen peroxide at 65° C. The dyestuff obtained represents, when dried, a red-brown powder which dissolves in water with an orange-red color, and in sulfuric acid 60° Bé. with a light blue color. When dyed on cotton it yields reddish orange shades; the dyeings show a very good alkaline and neutral dischargeability.

We claim:

1. Process of making azo dyestuffs of the stilbene series which comprises condensing 1 mol of a compound selected from the group consisting of 4,4'-dinitrostilbene-2,2'-disulfonic acid and 4,4'-dinitrodibenzyl-2,2'-disulfonic acid in alkaline solution with about 1.6 to 2 mols of an aminoazo compound selected from the group consisting of 4-amino-azobenzene-4'-sulfonic acid and 4-amino-azobenzene-4'-carboxylic acid, converting the mixture of dischargeable and non-dischargeable dyestuffs by means of mild reducing agents into the corresponding hydrazo-azo compounds, separating this mixture of hydrazo-azo compounds by fractional precipitation with salt in aqueous medium and re-oxidizing the hydrazo-azo compound belonging to the dischargeable dyestuff.

2. Process of making azo dyestuffs of the stilbene series which comprises condensing 1 mol of a compound selected from the group consisting of 4,4'-dinitrostilbene-2,2'-disulfonic acid and 4,4'-dinitrodibenzyl-2,2'-disulfonic acid in alkaline solution with about 1.6 to 2 mols of an aminoazo compound selected from the group consisting of 4-amino-azobenzene-4'-sulfonic acid and 4-amino-azobenzene-4'-carboxylic acid, converting the mixture of dischargeable and non-dischargeable dyestuffs by means of mild reducing agents in alkaline solution into the corresponding hydrazo-azo compounds, separating this mixture of hydrazo-azo compounds by fractional precipitation with salt in aqueous medium and re-oxidizing the hydrazo-azo compound belonging to the dischargeable dyestuff.

3. Process of making azo dyestuffs of the stilbene series which comprises condensing 1 mol of a compound selected from the group consisting of 4,4'-dinitrostilbene-2,2'-disulfonic acid and 4,4'-dinitrodibenzyl-2,2'-disulfonic acid in alkaline solution with about 1.6 to 2 mols of an aminoazo compound selected from the group consisting of 4-amino-azobenzene-4'-sulfonic acid and 4-amino-azobenzene-4'-carboxylic acid, converting the mixture of dischargeable and nondischargeable dyestuffs by means of dextrose in alkaline solution into the corresponding hydrazo-azo compounds, separating this mixture of hydrazo-azo compounds by fractional precipitation with salt in aqueous medium and re-oxidizing the hydrazo-azo compound belonging to the dischargeable dyestuff.

4. Process of making an azo dyestuff of the stilbene series which comprises condensing 1 mol of 4,4'-dinitrostilbene-2,2'-disulfonic acid in caustic alkaline solution with about 1.6 to 2 mols of 4-amino-azobenzene-4'-sulfonic acid, converting the mixture of dischargeable and non-dischargeable dyestuffs by means of a mild reducing agent in alkaline solution into the corresponding hydrazo-azo compounds, separating this mixture of hydrazo-azo compounds by fractional precipitation with salt in aqueous medium and re-oxidizing the hydrazo-azo compound belonging to the dischargeable dyestuff.

5. The process of claim 1 wherein, in the condensing step, the compound selected from the group consisting of 4,4'-dinitrostilbene-2,2'-disulfonic acid and 4,4'-dinitrodibenzyl-2,2'-disulfonic acid is added in portions to the aminoazo compound.

6. The process of claim 2 wherein, in the condensing step, the compound selected from the group consisting of 4,4'-dinitrostilbene-2,2'-disulfonic acid is added in portions to the aminoazo compound.

7. The process of claim 3 wherein, in the condensing step, the compound selected from the group consisting of 4,4'-dinitrostilbene-2,2'-disulfonic acid is added in portions to the aminoazo compound.

References Cited in the file of this patent

UNITED STATES PATENTS

| | | |
|---|---|---|
| 1,531,098 | Holzach | Mar. 24, 1925 |
| 1,959,461 | Delfs | May 22, 1934 |
| 1,982,159 | Gressly | Nov. 27, 1934 |
| 2,386,847 | Eagle | Oct. 16, 1945 |
| 2,574,782 | Gunst | Nov. 13, 1951 |